United States Patent
Cho et al.

(10) Patent No.: US 9,936,477 B2
(45) Date of Patent: Apr. 3, 2018

(54) METHOD FOR DETECTING LOCATION OF MOBILE COMPUTING DEVICE AND MOBILE COMPUTING DEVICE PERFORMING THE SAME

(71) Applicant: ISHARINGSOFT CO., LTD., Seoul (KR)

(72) Inventors: Hae Kyung Cho, Seoul (KR); Yong Jae Chuh, Seoul (KR)

(73) Assignee: ISHARINGSOFT CO., LTD., Seoul (KR)

( * ) Notice: Subject to any disclaimer, the term of this patent is extended or adjusted under 35 U.S.C. 154(b) by 0 days.

(21) Appl. No.: 15/320,648

(22) PCT Filed: Sep. 2, 2015

(86) PCT No.: PCT/KR2015/009264
§ 371 (c)(1),
(2) Date: Dec. 20, 2016

(87) PCT Pub. No.: WO2017/030233
PCT Pub. Date: Feb. 23, 2017

(65) Prior Publication Data
US 2017/0215167 A1    Jul. 27, 2017

(30) Foreign Application Priority Data
Aug. 18, 2015 (KR) .......................... 10-2015-0116323

(51) Int. Cl.
*H04W 64/00* (2009.01)
*H04W 88/02* (2009.01)
*H04W 88/08* (2009.01)

(52) U.S. Cl.
CPC .......... *H04W 64/006* (2013.01); *H04W 88/02* (2013.01); *H04W 88/08* (2013.01)

(58) Field of Classification Search
CPC .......... G01S 19/14; G01S 5/02; G01S 5/0252; G01S 5/14; H04L 29/08657;
(Continued)

(56) References Cited

U.S. PATENT DOCUMENTS 9,820,120 B2 * 11/2017 deCharms ............... H04W 4/22
2002/0184200 A1 * 12/2002 Ueda ..................... G06Q 10/10
(Continued)

FOREIGN PATENT DOCUMENTS

JP    2004-221991 A    8/2004
JP    2007-192771 A    8/2007
(Continued)

OTHER PUBLICATIONS

International Search Report for PCT/KR2015/009264 dated May 13, 2016 from Korean Intellectual Property Office.

*Primary Examiner* — Sharad Rampuria
(74) *Attorney, Agent, or Firm* — Paratus Law Group, PLLC

(57) ABSTRACT

Disclosed herein is a technology for detecting the location of a mobile computing device. A method for detecting the location of a mobile computing device includes the steps of (a) obtaining time, (b) storing the time and location information including GPS information and base station information associated with the time, and (c) obtaining base station information at the present time and estimating current GPS information without using a GPS if a correlation between the stored time and base station information is a specific reference or more.

4 Claims, 3 Drawing Sheets

(58) Field of Classification Search
CPC ....... H04L 29/08108; H04L 29/08936; H04W 4/02; H04W 64/00; H04W 48/04; H04M 1/72572; H04M 1/72577; G01C 21/20
See application file for complete search history.

(56) References Cited

U.S. PATENT DOCUMENTS

| | | | |
|---|---|---|---|
| 2007/0021122 A1* | 1/2007 | Lane | H04B 7/01 455/441 |
| 2011/0140962 A1* | 6/2011 | McNamara | G01S 5/02 342/357.64 |
| 2013/0317944 A1* | 11/2013 | Huang | G01S 5/0252 705/26.61 |
| 2016/0263435 A1* | 9/2016 | Venkatraman | G01S 19/13 |
| 2016/0269868 A1* | 9/2016 | Su | H04B 1/385 |

FOREIGN PATENT DOCUMENTS

| | | |
|---|---|---|
| KR | 10-2000-0014750 A | 3/2000 |
| KR | 10-2010-0005339 A | 1/2010 |
| KR | 10-2014-0073677 A | 6/2014 |
| WO | WO 2014/104465 A1 | 7/2014 |

\* cited by examiner

METHOD FOR DETECTING LOCATION OF MOBILE COMPUTING DEVICE AND MOBILE COMPUTING DEVICE PERFORMING THE SAME

This application is a National Stage Patent Application of PCT International Patent Application No. PCT/KR2015/009264 (filed on Sep. 2, 2015) under 35 U.S.C. § 371, which claims priority to Korean Patent Application No. 10-2015-0116323 (filed on Aug. 18, 2015), which are all hereby incorporated by reference in their entirety.

BACKGROUND OF THE INVENTION

Field of the Invention

The present invention relates to a technology for detecting the location of a mobile computing device and, more particularly, to a method for detecting the location of a mobile computing device, which is capable of detecting a location without using a GPS, and a mobile computing device performing the same.

Discussion of the Related Art

A global positioning system (GPS) receiver receives signals transmitted by three or more GPS satellites and determines the location of the receiver. If a time difference between the signals transmitted by the satellites and a signal received by the GPS receiver is measured, the distance between the satellites and the GPS receiver may be calculated. In this case, the signals transmitted by the satellites include information about the locations of the satellites. The GPS receiver may calculate its location using a method, such as trilateration, based on the distance between the GPS receiver and at least three satellites and the locations of the satellites. A mobile computing device including a GPS module may calculate its location by receiving signals transmitted by satellites.

In the case of a location detection method using a GPS, however, there is a problem in that an available time of a mobile computing device having a limited battery capacity is significantly reduced because the consumption of the battery is great.

Korean Patent Application Publication No. 10-2014-0073677 relates to a method for determining the location of a terminal in a communication system using multiple beams. The method may include the steps of receiving a first beam from a first point, receiving a second beam from a second point, and determining the location of a terminal using information about the first beam and the second beam. If such a location determination method is used, when two or more valid beams are received in a system using multiple beams, the location of a terminal can be determined using the angles of beams and information about the departure and/or final coordinates of the beams even without using a positioning device, such as a GPS.

SUMMARY OF THE INVENTION

An embodiment of the present invention is directed to the provision of a method for detecting the location of a mobile computing device, which is capable of detecting the location of a mobile computing device without using a GPS, and a mobile computing device performing the same.

An embodiment of the present invention is directed to the provision of a method for detecting the location of a mobile computing device, which is capable of increasing an available time of a mobile computing device by detecting the location of the mobile computing device without using a GPS, and a mobile computing device performing the same.

An embodiment of the present invention is directed to the provision of a method for detecting the location of a mobile computing device, which is capable of improving location accuracy by continuously updating location information, and a mobile computing device performing the same.

In the embodiments, a method for detecting the location of a mobile computing device includes the steps of (a) obtaining time, (b) storing the time and location information including GPS information and base station information associated with the time, and (c) obtaining base station information at the present time and estimating current GPS information without using a GPS if a correlation between the stored time and base station information is a specific reference or more.

In one embodiment, the step (b) may include storing the time and the location information in the form of a movement flow vector according to a movement flow.

In one embodiment the step (c) may include detecting similarity between the most recent movement flow section in the current movement flow and the past movement flow section in one of previously stored movement flow vectors before calculating the correlation.

In one embodiment, the step (b) may include measuring the movement flow using a time period function below.

[Time Period Function]

$$f(t)=f(t-1)*\{E(v(t-1))\}$$

$f(t)$ is a time period to be measured now, $f(t-1)$ is a previously measured time period, $v(t)$ is a current movement speed of the mobile computing device, $v(t-1)$ is a previous movement speed of the mobile computing device, and $E(\ )$ is a movement period prediction function estimated based on the movement speeds.

In one embodiment, the step (c) may include obtaining the current GPS information using the GPS if the intensity of a base station signal included in the base station information at the present time is equal to or lower than the previously stored intensity of the base station signal by specific intensity although the correlation is the specific reference or more.

In one embodiment, the method for detecting the location of a mobile computing device may further include the step (d) of comparing the base station information at the present time with base station information obtained at a right-before time if the correlation is less than the specific reference and the mobile computing device is incapable of using the GPS, calculating GPS information at the right-before time as the current GPS information if, as a result of the comparison, the pieces of base station information are found to be identical, estimating the current GPS information by comparing the base station information at the present time with the pieces of stored base station information if, as a result of the comparison, the pieces of base station information are found to be different, and estimating the GPS information at the right-before time to be the current OPS information by incorporating the GPS information at the right-before time into the base station information at the present time if the pieces of stored base station information do not include base station information, such as the base station information at the present time.

In the embodiments, a mobile computing device includes memory, a GPS module, and a processor, wherein the processor performs processes of (a) obtaining time, (b) storing the time and location information including GPS information and base station information associated with the time, and (c) obtaining base station information at the present time and estimating current GPS information without using the GPS module if a correlation between the time and base station information stored in the memory is a specific reference or more.

DETAILED DESCRIPTION OF THE EMBODIMENTS

Figure 1:
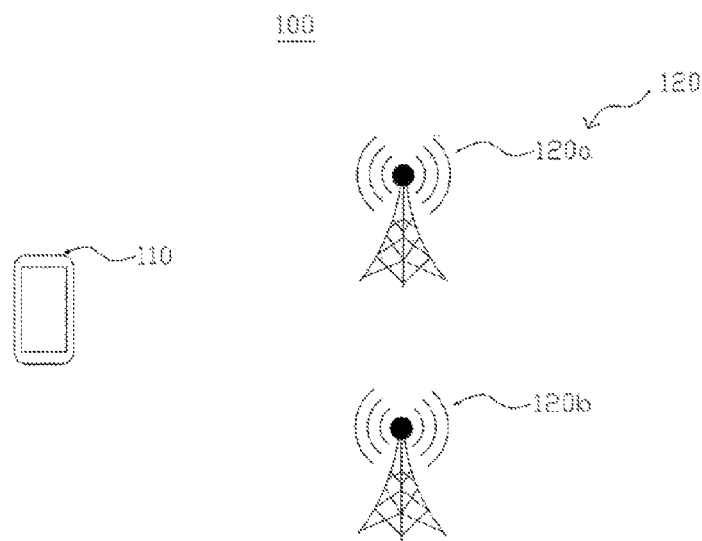
FIG. 1 is a diagram illustrating a location detection system according to an embodiment of the present invention.

A description of the present invention is merely an embodiment for a structural and/or functional description. The range of right of the present invention should not be construed as being limited to embodiments described in the context. That is, the embodiments may be modified in various forms, and the range of right of the present invention should be construed as including equivalents which may realize the technological spirit. Furthermore, an object or effect proposed in the present invention does not mean that a specific embodiment should include all of objects or effects or should include a corresponding effect, and thus the range of right of the present invention should not be understood to be restricted thereby.

The meaning of terms described in this application should be construed as follows.

The terms, such as the "first" and the "second", are used to distinguish one element from the other element, and the range of right of the present invention should not be restricted by the terms. For example, a first element may be named a second element. Likewise, a second element may be named a first element.

When it is said that one element is described as being "connected" to the other element, the one element may be directly connected to the other element, but it should be understood that a third element may be interposed between the two elements. In contrast, when it is described that one element is described as being "directly connected" to the other element, it should be understood that a third element is not interposed between the two elements. Meanwhile, the same principle applies to other expressions, such as "between ~" and "just between ~" or "adjacent to ~" and "adjacent just to ~", which describe a relation between elements.

An expression of the singular number should be understood to include plural expressions, unless clearly expressed otherwise in the context. The terms, such as "include" or "have", should be understood to indicate the existence of a set characteristic, number, step, operation, element, part, or a combination of them and not to exclude the existence of one or more other characteristics, numbers, steps, operations, elements, parts, or a combination of them or a possibility of the addition of them.

In each of steps, symbols (e.g., a, b, and c) are used for convenience of a description, and the symbols do not describe order of the steps. The steps may be performed in order different from order described in the context unless specific order is clearly described in the context. That is, the steps may be performed according to described order, may be performed substantially at the same time, or may be performed in reverse order.

The present invention may be implemented in a computer-readable recording medium in the form of computer-readable code. The computer-readable recording medium includes all types of recording devices in which data readable by a computer system is stored. The computer-readable recording medium may include ROM, RAM, CD-ROM, magnetic tapes, floppy disks, and optical data storages, for example. Furthermore, the computer-readable recording medium includes one implemented in the form of carrier waves (e.g., transmission through the Internet). Furthermore, the computer-readable recording medium may be distributed to computer systems connected over a network, and the computer-readable code may be stored and executed in the computer systems in a distributed manner.

All the terms used herein, including technological or scientific terms, have the same meanings as those that are typically understood by those skilled in the art, unless otherwise defined. Terms, such as ones defined in common dictionaries, should be construed as having the same meanings as those in the context of related technology and should not be construed as having ideal or excessively formal meanings, unless clearly defined in the specification.

FIG. 1 is a diagram illustrating a location detection system according to an embodiment of the present invention.

Referring to FIG. 1 the location detection system 100 includes a mobile computing device 110 and a base station 120. The mobile computing device 110 may be connected to the base station 120 over a wireless telephone network. The mobile computing device 110 may include a portable phone, a smart phone, a tablet PC or a notebook.

The mobile computing device 110 sends and receives data to and from a base station 120a which covers a location where the mobile computing device 110 is located. If the location of the mobile computing device 110 is changed by a user who owns the mobile computing device 110, the mobile computing device 110 may send and receive data to and from a base station 120b which covers the changed location. Although the location of the mobile computing device 110 is changed, the mobile computing device 110 may be continuously connected to a wireless telephone network through a handover process.

The base station 120 may wirelessly send and receive data to and from the mobile computing device 110 located within coverage (or cell) of the corresponding base station.

In one embodiment, the mobile computing device 110 may calculate and store time and location information, including current GPS information and base station information associated with the corresponding time. For example, the mobile computing device 110 may periodically obtain time, may calculate information about a GPS and base station regarding a location at the obtained time, and may store the calculated information along with the corresponding time. The mobile computing device 110 may accumulatively store time and location information for each time zone.

Thereafter, the mobile computing device 110 may estimate current GPS information using the accumulated time and location information without using a GPS. For example, the mobile computing device 110 may obtain base station information at the present time. If a correlation between the present time and the base station information and between stored time and the base station information is a specific reference or more, the mobile computing device 110 may estimate current GPS information using the stored location information without using a GPS.

If the correlation between the present time and the base station information and between the stored time and the base station information is lower than the specific reference, the mobile computing device 110 may obtain current GPS information using a GPS and update location information by adding the location information.

Figure 2:
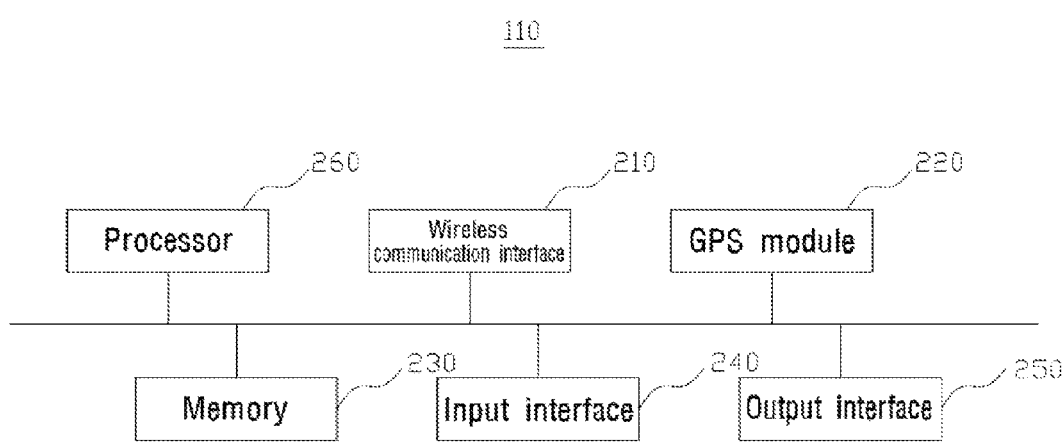
FIG. 2 is a block diagram illustrating the configuration of a mobile computing device shown in FIG. 1.

FIG. 2 is a block diagram illustrating the configuration of the mobile computing device shown in FIG. 1.

Referring to FIG. 2, the mobile computing device 110 includes a wireless communication interface 210, a GPS module 220, memory 230, an input interface 240, an output interface 250, and a processor 260.

The wireless communication interface 210 wirelessly sends and receives data to and from the base station 120. For example, the wireless communication interface 210 may include a cellular communication module.

The GPS module 220 calculates GPS information about the current location of the mobile computing device 110 based on GPS signals received from satellites. The GPS information includes latitude information and longitude information.

The memory 230 stores data necessary for the operation of the mobile computing device 110. The memory 230 may be implemented using various types of volatile memory.

The input interface 240 includes an interface for receiving a user input. For example, the input interface 240 may include the adaptor of input means, such as a touch screen or a keypad.

The output interface 250 includes an interface for outputting information (e.g., the current location of the mobile computing device). For example, the output interface 250 may include the adaptor of output means, such as a touch screen.

The processor 260 may drive the mobile computing device 110 by controlling the wireless communication interface 210, the GPS module 220, the memory 230, the input interface 240 and the output interface 250.

In one embodiment, the processor 260 may obtain time and obtain GPS information at the corresponding time from the GPS module 220. Furthermore, the processor 260 may obtain information about a base station connected to the mobile computing device 110 at the corresponding time, and may store time and location information, including GPS information and base station information at the corresponding time, in the memory 230 along with the corresponding time.

Thereafter, the processor 260 may estimate GPS information about the current location of the mobile computing device 110 using the time and location information cumulatively stored in the memory 230 without using the GPS module 220.

Figure 3:
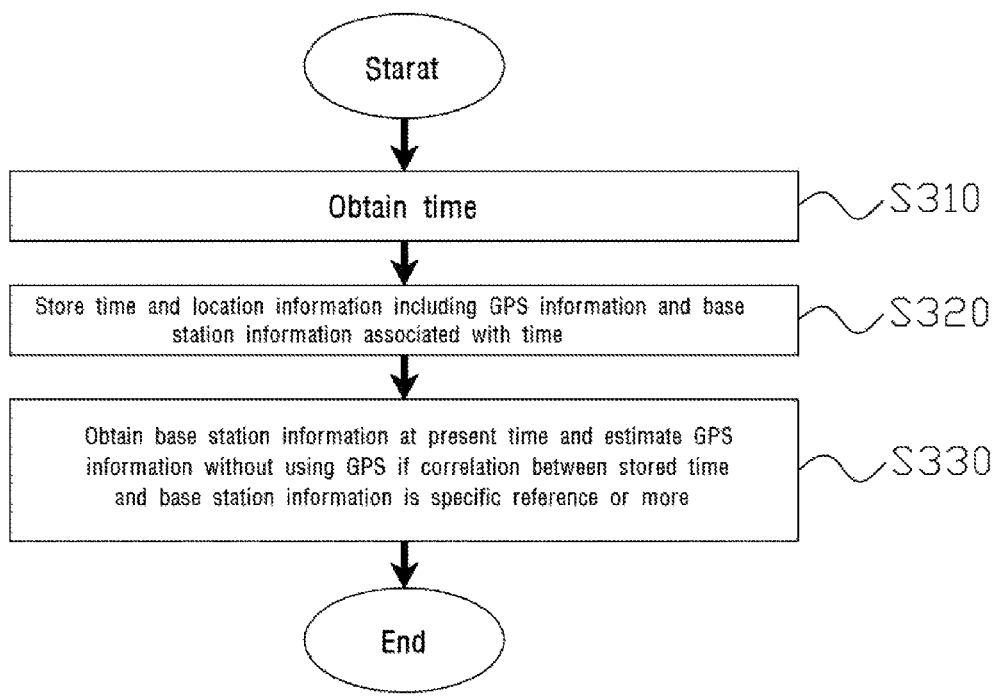
FIG. 3 is a flowchart illustrating a location detection method performed by the mobile computing device of FIG. 1.

FIG. 3 is a flowchart illustrating a location detection method performed by the mobile computing device of FIG. 1.

Referring to FIG. 3, the mobile computing device 110 obtains the present time at step S310, and generates and stores the obtained time and location information including GPS information and base station information associated with the time at step S320.

In one embodiment, the mobile computing device 110 may store time and location information in the form of a movement flow vector according to a movement flow. For example, the movement flow vector may be expressed as in Equation 1 below.

$$V=\{(t1,y1)),(t2,(x2,y2)),\ldots\}$$

In Equation 1, V is a movement flow vector, t1 is time, (x1, y1) is location information, x1 is GPS information at a t1 time, and y1 is base station information at the t1 time.

In one embodiment, the mobile computing device 110 may periodically obtain time in a preset period, may generate location information about the corresponding time, and may measure a movement flow.

In another embodiment, the mobile computing device 110 may measure a movement flow using a time period function of Equation 2 below.

[Time Period Function]

$$f(t)=f(t-1)*\{E(v(t)/v(t-1))\}$$

In Equation 2, f(t) is a time period to be measured now, f(t−1) is a previously measured time period, v(t) is the current movement speed of a mobile computing device, v(t−1) is the previous movement speed of the mobile computing device, and E( ) is a movement period prediction function estimated based on the movement speeds.

Figure 4:
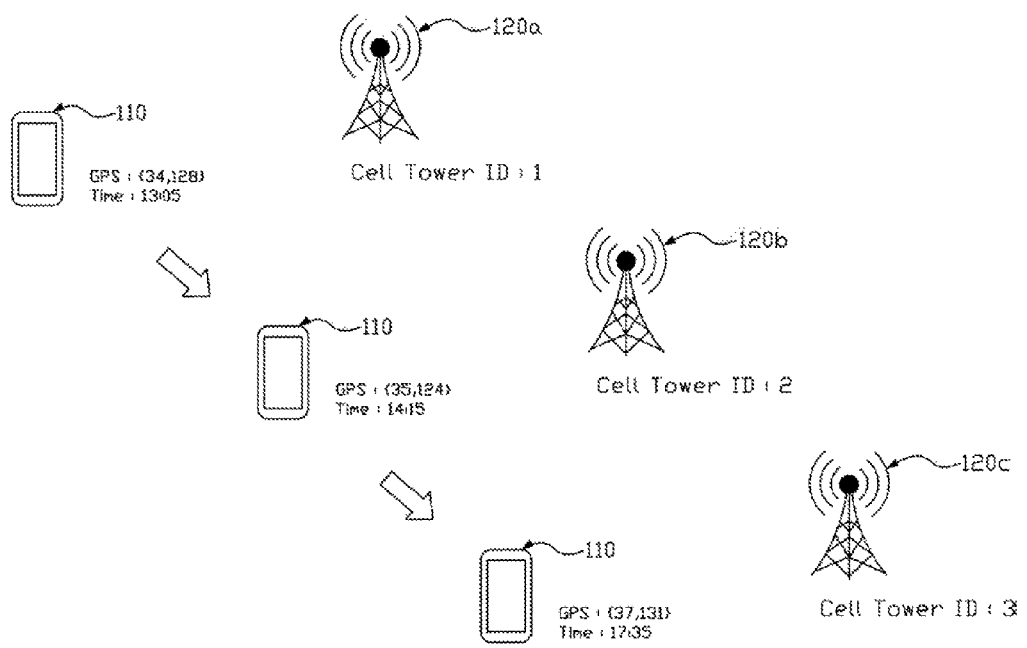
FIG. 4 is a diagram illustrating a process for storing time and location information including GPS information and base station information associated with the time in the mobile computing device of FIG. 1.

FIG. 4 is a diagram illustrating a process for storing location information including time and GPS information and base station information associated with the time in the mobile computing device of FIG. 1.

In FIG. 4, it is assumed that the mobile computing device 110 stores location information at a t1 time "13:05", a t2 time "14:15", and a t3 time "17:35".

The mobile computing device 110 may store time and location information in the form of a movement flow vector based on GPS information {34 (latitude), 128 (longitude)} and base station information 1 (Cell tower ID) calculated at the t1 time "13:05".

Furthermore, the mobile computing device 110 may store GPS information {35, 124} and base station information 2 calculated at the t2 time "14:15" and GPS information {37, 131} and base station information 3 calculated at the t3 time "17:35" in the form of a movement flow vector.

A movement flow vector generated based on the information from the t1 time "13:05" to the t3 time "17:35" is as follows.

$$V=\{(13:05,(\{34,128\},1)),(14:15,(\{35,124\},2)),(17:35,(\{37,131\},3))\}$$

Referring back to FIG. 3, the mobile computing device 110 may accumulate the time and location information by continuously performing step S310 and step S320.

Thereafter, the mobile computing device 110 may estimate GPS information about the current location of the mobile computing device 110 using the cumulatively stored time and location information without using a GPS.

The mobile computing device 110 obtains base station information at the present time, and estimates current GPS information without using a GPS if a correlation between the present time and the base station information and between the stored time and the base station information is a specific reference or more at step S330.

In one embodiment, the mobile computing device 110 may detect similarity between the most recent movement flow section in the current movement flow of the mobile computing device 110 and the past movement flow section in one of previously stored movement flow vectors. For example, the mobile computing device 110 may detect the similarity by performing internal product on the most recent movement flow section in the current movement flow and the past movement flow section. The mobile computing device 110 may determine the similarity to be higher as the internal product value is reduced. Alternatively, the mobile computing device 110 may detect the similarity by calculating a difference between the most recent movement flow section in the current movement flow and corresponding location information (e.g., GPS information and base station information) of the past movement flow section. The mobile computing device 110 may determine the similarity to be higher as the difference value is reduced.

The mobile computing device 110 may calculate the correlation based on similarity between corresponding movement flow sections. For example, the mobile computing device 110 may calculate the correlation according to predefined functions (e.g., an arithmetic average function, a weighted average function, and other defined functions) based on a similarity value between corresponding movement flow sections.

If the calculated correlation is a specific reference or more, the mobile computing device 110 estimates current GPS information based on the stored time and location information without using a GPS. For example, if stored time and location information are used in a condition, such as FIG. 4, when the present time is 14:10 minutes and current base station information is 2 (Cell tower ID), the mobile computing device 110 may estimate the current GPS information to be {35,124}.

If the calculated correlation is smaller than the specific reference, the mobile computing device 110 may obtain current GPS information using a GPS and update location information by adding the location information.

In one embodiment, if the correlation is less than the specific reference and the mobile computing device 110 is incapable of using a GPS, the mobile computing device 110 may compare base station information at the present time with base station information obtained at a previous time, and may estimate GPS information at the previous time to be current GPS information if, as a result of the comparison, the pieces of base station information are found to be the same. If, as a result of the comparison, the pieces of base station information are found to be different, the mobile computing device 110 may compare base station information at the present time with pieces of stored base station information, and may estimate current GPS information. If pieces of stored base station information do not include base station information, such as base station information at the present time, the mobile computing device 110 may estimate GPS information at a right-before time to be current GPS information by incorporating the GPS information at the right-before time into base station information at the present time.

In another embodiment, although the correlation is the specific reference or more, if the intensity of a base station signal included in base station information at the present time is equal to or lower than the previously stored intensity of a base station signal by specific intensity, the mobile computing device 110 may obtain current GPS information using a GPS. That is, if the intensity of the base station signal included in the base station information at the present time is weaker than the previously stored intensity of the base station signal, the mobile computing device 110 may obtain the current GPS information using the GPS.

The method for detecting the location of a mobile computing device and the mobile computing device performing the same according to the embodiments of the present invention can detect the location of a mobile computing device without using a GPS.

The method for detecting the location of a mobile computing device and the mobile computing device performing the same according to the embodiments of the present invention can increasing an available time of the mobile computing device by detecting the location of the mobile computing device without using a GPS.

The method for detecting the location of a mobile computing device and the mobile computing device performing the same according to the embodiments of the present invention can improve location accuracy by continuously updating location information.

While the preferred embodiments of this application have been described above, those skilled in the art will understand that this application may be modified and changed in various ways without departing from the spirit and scope of the invention as defined in the following claims.

What is claimed is:

1. A method, executed using at least one processor, for detecting a location of a mobile computing device, the method comprising:
    obtaining time;
    storing, in a form of a movement flow vector according to a movement flow, time and location information comprising GPS information and base station information associated with the time;
    measuring the movement flow using a time period function $f(t)=f(t-1)*\{E(v(t)/v(t-1))\}$;
    obtaining base station information at a present time and estimating current GPS information without using a GPS if a correlation between the stored time and base station information is equal to or greater than a predetermined value;
    comparing the base station information at the present time with base station information obtained at a right-before time if the correlation is less than the predetermined value and the mobile computing device is incapable of using the GPS;
    calculating GPS information at the right-before time as the current GPS information if, as a result of the comparison, pieces of base station information are found to be identical;
    estimating the current GPS information by comparing the base station information at the present time with the pieces of stored base station information if, as a result of the comparison, the pieces of base station information are found to be different; and
    estimating the GPS information at the right-before time to be the current GPS information by incorporating the GPS information at the right-before time into the base station information at the present time if the pieces of stored base station information do not include base station information, such as the base station information at the present time,
    wherein $f(t)$ is a time period to be measured now, $f(t-1)$ is a previously measured time period, $v(t)$ is a current movement speed of the mobile computing device, $v(t-1)$ is a previous movement speed of the mobile computing device, and $E(v(t)/v(t-1))$ is a movement period prediction function estimated based on the movement speeds.

2. The method of claim 1, further comprising detecting similarity between a most recent movement flow section in a current movement flow and a past movement flow section in one of previously stored movement flow vectors before calculating the correlation.

3. The method of claim 1, further comprising obtaining the current GPS information using the GPS if intensity of a base station signal included in the base station information at the present time is equal to or lower than previously stored intensity of the base station signal by specific intensity although the correlation is equal to or greater than the predetermined value.

4. A mobile computing device, comprising:
memory;
a GPS module; and
a processor configured to:
   obtain time;
   store in the memory, in a form of a movement flow vector according to a movement flow, time and location information comprising GPS information and base station information associated with the time;
   measure the movement flow using a time period function $f(t)=f(t-1)*\{E(v(t)/v(t-1))\}$;
   obtain base station information at a present time and estimating current GPS information without using the GPS module if a correlation between the time and base station information stored in the memory is equal to or greater than a predetermined value;
   compare the base station information at the present time with base station information obtained at a right-before time if the correlation is less than the predetermined value and the mobile computing device is incapable of using the GPS module;
   calculate GPS information at the right-before time as the current GPS information if, as a result of the comparison, the pieces of base station information are found to be identical;
   estimate the current GPS information by comparing the base station information at the present time with the pieces of stored base station information if, as a result of the comparison, the pieces of base station information are found to be different; and
   estimate the GPS information at the right-before time to be the current GPS information by incorporating the GPS information at the right-before time into the base station information at the present time if the pieces of stored base station information do not include base station information, such as the base station information at the present time,
wherein $f(t)$ is a time period to be measured now, $f(t-1)$ is a previously measured time period, $v(t)$ is a current movement speed of the mobile computing device, $v(t-1)$ is a previous movement speed of the mobile computing device, and $E(v(t)/v(t-1))$ is a movement period prediction function estimated based on the movement speeds.

* * * * *